(12) United States Patent
Furukawa et al.

(10) Patent No.: US 9,202,528 B2
(45) Date of Patent: Dec. 1, 2015

(54) MAMR HEAD WITH RECESSED STO

(71) Applicant: HGST Netherlands B.V., Amsterdam (NL)

(72) Inventors: Masaru Furukawa, Kanagawa (JP); Jianhua Li, Kanagawa (JP); Masato Matsubara, Kanagawa (JP); Masato Shiimoto, Odawara (JP)

(73) Assignee: HGST NETHERLANDS B.V., Amsterdam (NL)

( * ) Notice: Subject to any disclaimer, the term of this patent is extended or adjusted under 35 U.S.C. 154(b) by 0 days.

(21) Appl. No.: 14/040,151

(22) Filed: Sep. 27, 2013

(65) Prior Publication Data
US 2015/0092292 A1 Apr. 2, 2015

(51) Int. Cl.
G11B 5/17 (2006.01)
G11B 33/14 (2006.01)
G11B 5/31 (2006.01)
G11B 5/00 (2006.01)

(52) U.S. Cl.
CPC ............ G11B 33/1433 (2013.01); G11B 5/314 (2013.01); G11B 2005/0024 (2013.01)

(58) Field of Classification Search
CPC .... G11B 5/127; G11B 5/1278; G11B 5/3116; G11B 5/235; G11B 33/1433; G11B 5/314
USPC .............................. 360/119.03, 119.04, 125.3
See application file for complete search history.

(56) References Cited

U.S. PATENT DOCUMENTS

| 8,139,322 | B2 | 3/2012 | Yamada et al. | |
| 8,154,825 | B2 | 4/2012 | Takashita et al. | |
| 8,305,711 | B2 | 11/2012 | Li et al. | |
| 8,320,079 | B2 | 11/2012 | Iwasaki et al. | |
| 8,654,480 | B2* | 2/2014 | Shimizu et al. | 360/128 |
| 8,755,153 | B2* | 6/2014 | Kudo et al. | 360/321 |
| 8,767,346 | B2* | 7/2014 | Yamada et al. | 360/123.11 |
| 2010/0007992 | A1* | 1/2010 | Yamada et al. | 360/244 |
| 2010/0027161 | A1 | 2/2010 | Takagishi et al. | |
| 2010/0073806 | A1* | 3/2010 | Koui et al. | 360/75 |
| 2010/0134922 | A1 | 6/2010 | Yamada et al. | |
| 2011/0090603 | A1 | 4/2011 | Bai | |
| 2011/0205655 | A1* | 8/2011 | Shimizu et al. | 360/39 |
| 2011/0216435 | A1* | 9/2011 | Shiimoto et al. | 360/59 |
| 2011/0273800 | A1 | 11/2011 | Takano et al. | |
| 2011/0279921 | A1 | 11/2011 | Zhang et al. | |
| 2012/0069465 | A1 | 3/2012 | Sato et al. | |
| 2013/0215530 | A1* | 8/2013 | Igarashi et al. | 360/59 |

OTHER PUBLICATIONS

Kazuetsu Yoshida et al. "Spin Torque Oscillator With Negative Magnetic Anisotropy Materials; for MAMR"; IEEE Transaction on Magnetics, vol. 46, N0. 6, Jun. 2010; 4 pages.; Japan.

* cited by examiner

Primary Examiner — Angel Castro
(74) Attorney, Agent, or Firm — Patterson & Sheridan, LLP

(57) ABSTRACT

Embodiments of the present invention generally relate to a microwave assisted magnetic recording (MAMR) head. The MAMR head includes a main pole, a trailing shield, and a spin torque oscillator (STO) disposed between the main pole and the trailing shield. The STO is recessed from an air bearing surface.

20 Claims, 5 Drawing Sheets

MAMR HEAD WITH RECESSED STO

BACKGROUND

1. Field

Embodiments of the present invention generally relate to a perpendicular magnetic recording head structure for use in a magnetic disk drive.

2. Description of the Related Art

Over the past few years, microwave-assisted magnetic recording (MAMR) has been studied as a recording method to improve the areal density of a magnetic read/write device, such as a hard disk drive (HDD). MAMR enabled magnetic recording head utilizes a spin torque oscillator (STO) for generating a microwave (high frequency AC magnetic field). Typically the STO may include a field generation layer (FGL) for generating an AC magnetic field, a spacer layer, and a spin polarization layer (SPL) for transmitting spin polarized torque. When the magnetic field from the write head is applied and current is conducted to the STO, the STO oscillates and may provide an AC magnetic field to the medium. The AC magnetic field may reduce the coercive force of the recording medium, thus high quality recording by MAMR may be achieved.

A major cause of MAMR specific head failures is the electrostatic breakdown of the STO caused by contact between the STO and the medium. During operation, a bias voltage is applied to the STO to increase the AC magnetic field. The bias voltage increases the temperature of the STO, causing the STO to protrude toward the recording medium. Therefore, there is a need in the art for an improved recording head for MAMR.

SUMMARY OF THE INVENTION

Embodiments of the present invention generally relate to a MAMR head. The MAMR head includes a main pole, a trailing shield, and a STO disposed between the main pole and the trailing shield. The STO is recessed from an air bearing surface.

In one embodiment, a MAMR head is disclosed. The MAMR head includes a main pole, a trailing shield, and a STO positioned between the main pole and the trailing shield. The STO has a surface facing an air bearing surface and the surface is recessed from the air bearing surface.

In another embodiment, a MAMR head is disclosed. The MAMR head includes a main pole having an end extending to an air bearing surface, a trailing shield having an end extending to the air bearing surface, and a STO positioned between the main pole and the trailing shield. The STO has a surface facing the air bearing surface and the surface is recessed from the air bearing surface.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments of the present invention generally relate to a MAMR head. The MAMR head includes a main pole, a trailing shield, and a STO disposed between the main pole and the trailing shield. The STO is recessed from an air bearing surface.

Figure 1:
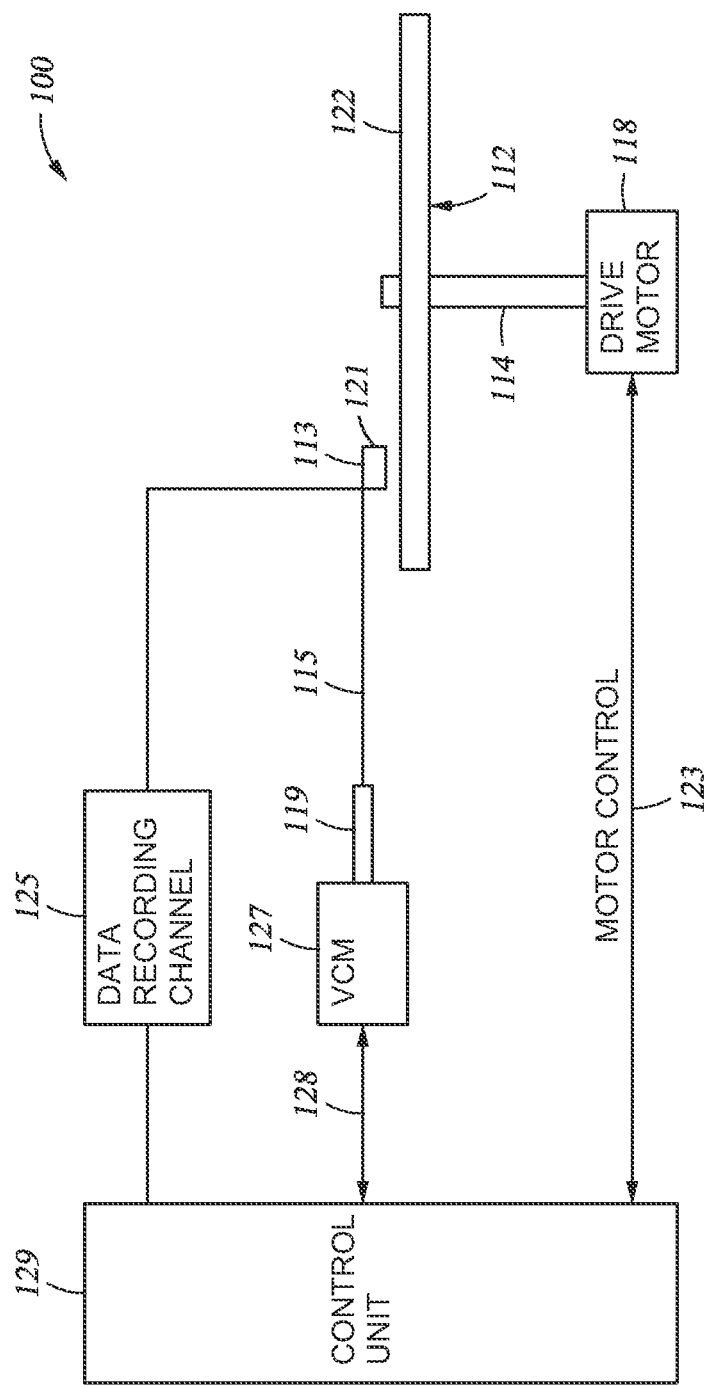
FIG. 1 illustrates a disk drive system, according to embodiments described herein.

FIG. 1 illustrates a disk drive 100 embodying this invention. As shown, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121 that may include a STO for applying an AC magnetic field to the disk surface 122. As the magnetic disk rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases the slider 113 against the disk surface 122. Each actuator arm 119 is attached to an actuator means 127. The actuator means 127 as shown in FIG. 1A may be a voice coil motor (VCM). The VCM comprises a coil movable within a fixed magnetic field, the direction and speed of the coil movements being controlled by the motor current signals supplied by control unit 129.

During operation of the MAMR enabled disk drive 100, the rotation of the magnetic disk 112 generates an air bearing between the slider 113 and the disk surface 122 which exerts an upward force or lift on the slider 113. The air bearing thus counter-balances the slight spring force of suspension 115 and supports slider 113 off and slightly above the disk 112 surface by a small, substantially constant spacing during normal operation. The AC magnetic field generated from the magnetic head assembly 121 lowers the coercivity of the high-coercivity media so that the write elements of the magnetic head assemblies 121 may correctly magnetize the data bits in the media.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2A:
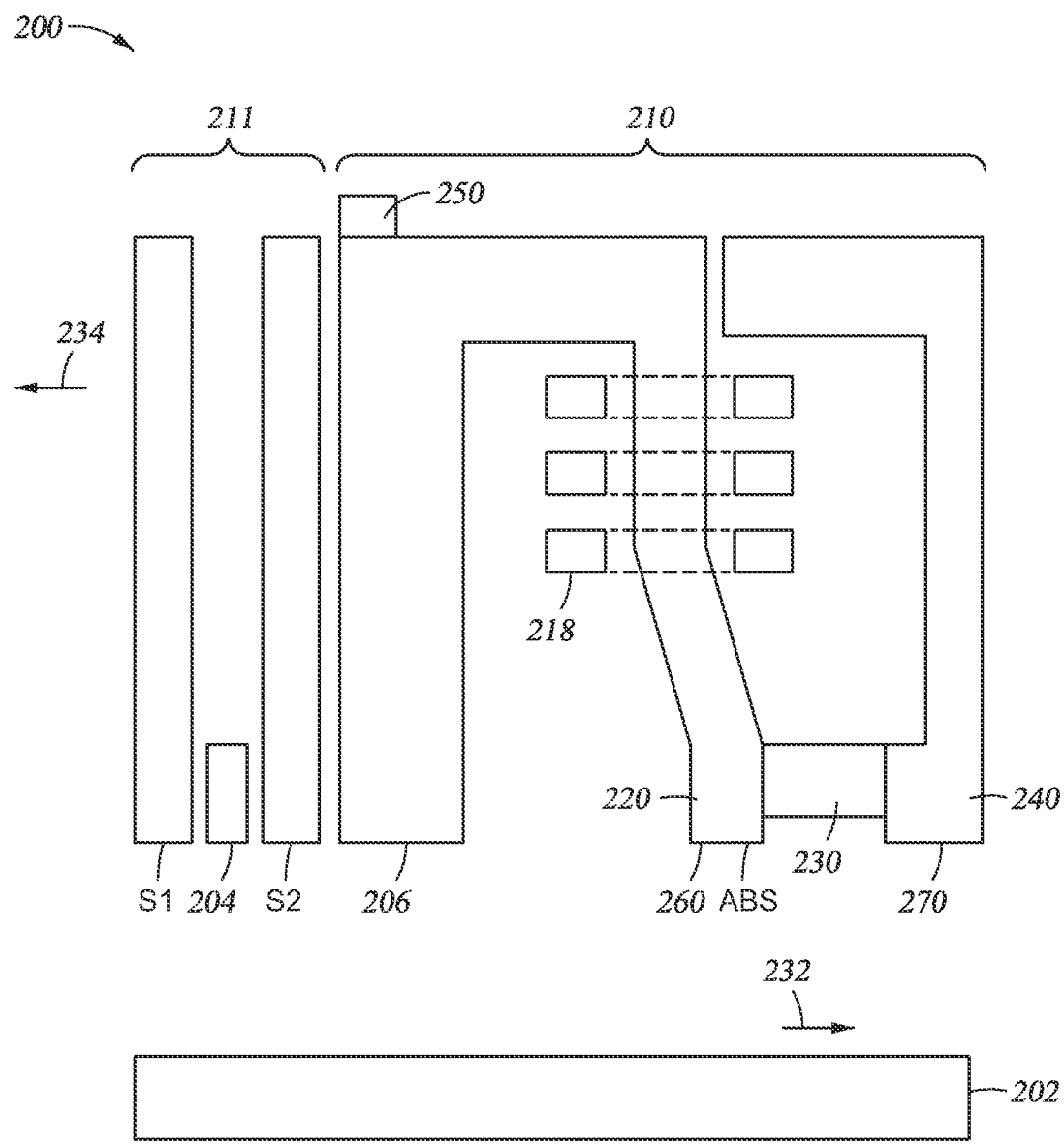
FIGS. 2A-2B are cross sectional views of a MAMR read/write head and magnetic disk of the disk drive system of FIG. 1, according to one embodiment of the invention.

FIG. 2A is a fragmented, cross sectional side view through the center of a MAMR read/write head 200 facing magnetic disk 202. The read/write head 200 and magnetic disk 202 may correspond to the magnetic head assembly 121 and magnetic disk 112, respectively in FIG. 1. The read/write head 200 includes an ABS, a magnetic write head 210 and a magnetic read head 211, and is mounted such that the ABS is facing the magnetic disk 202. In FIG. 2A, the disk 202 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing device 204 located between MR shields S1 and S2. The magnetic fields of the adjacent magnetized regions in the magnetic disk 202 are detectable by the MR (or MTJ) sensing element 204 as the recorded bits.

The write head 210 includes a return pole 206, a STO 230 disposed between a main pole 220 and a trailing shield 240, and a coil 218 that excites the main pole 220. A recording magnetic field is generated from the main pole 220 and the trailing shield 240 helps making the magnetic field gradient of the main pole 220 steep. The main pole 220 may be a magnetic material such as a CoFe alloy. In one embodiment, the main pole 220 has a saturated magnetization (Ms) of 2.4 T and a thickness of about 300 nanometers (nm). The trailing shield 240 may be a magnetic material such as NiFe alloy. In one embodiment, the trailing shield 240 has an Ms of about 1.2 T.

Figure 2B:
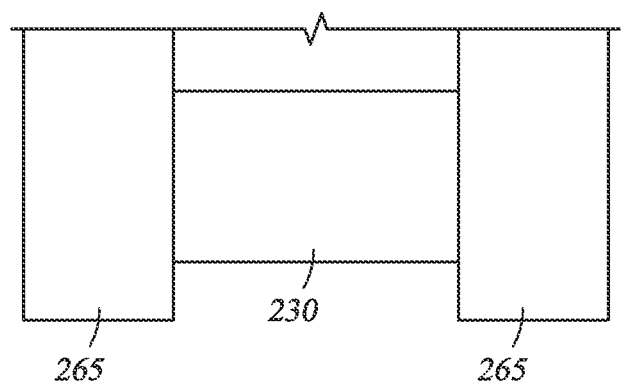

The main pole 220 and the trailing shield 240 have ends 260, 270 defining part of the ABS, and the STO 230 disposed between the main pole 220 and the trailing shield 240 is recessed from the ABS. The STO 230 may be surrounded by an insulating material 265 in a cross-track direction (into and out of the paper). As shown in FIG. 2B, the insulating material 265 may extend to the ABS. During operation, the STO 230 generates an AC magnetic field that travels to the magnetic disk 202 to lower the coercivity of the region of the magnetic disk 202 adjacent to the STO 230. The STO 230 will be discussed in detail below. The write head 210 further includes a heater 250 for adjusting the distance between the read/write head 200 and the magnetic disk 202. The location of the heater 250 is not limited to above the return pole 206, as shown in FIG. 2A. The heater 250 may be disposed at any suitable location.

Figure 3:
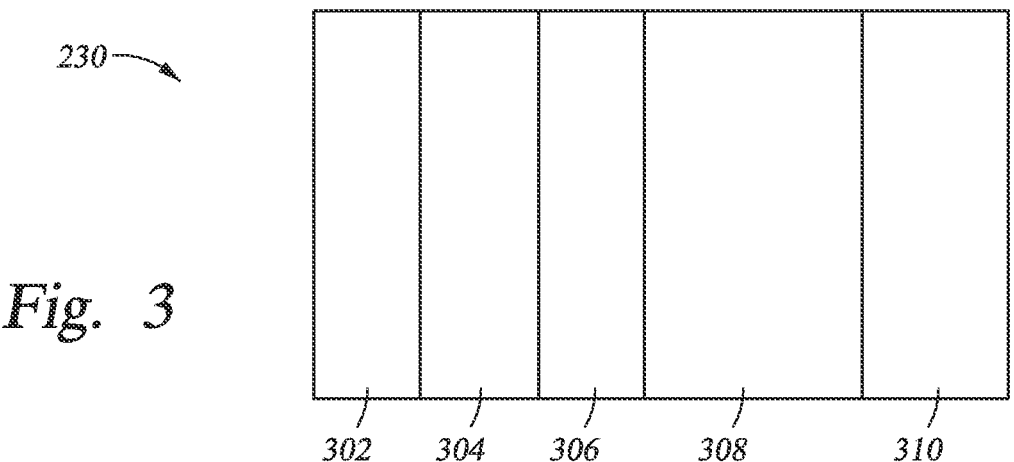
FIG. 3 is a cross sectional view of a STO according to one embodiment of the invention.

FIG. 3 is a cross sectional view of the STO 230 according to one embodiment of the invention. As shown in FIG. 3, the STO 230 includes an underlayer 302, an SPL 304, a spacer layer 306, an FGL 308, and a cap layer 310. The underlayer 302 and the cap layer 310 may be electroconductive metal materials. In one embodiment, the underlayer 302 is tantalum (Ta) having a thickness of about 2 nm, and the cap layer 310 is chromium (Cr) having a thickness of about 2 nm. The SPL 304 may be a cobalt (Co)/nickel (Ni) layer having perpendicular magnetic anisotropy. In one embodiment, the thickness of the SPL 304 is about 9 nm, the Ms is about 1.2 T, and the perpendicular anisotropic magnetic field (Hk) is about 13 KOe. Other materials may be used as the SPL 304, such as CoPt, CoCrPt, CoPd, FePt, CoFePd, or TbFeCo.

The spacer layer 306 may be a metal material having long spin diffusion length such as Au, Ag, or Cu, when the STO 230 employs current perpendicular to plane (CPP)—giant magnetoresistance (GMR). When the STO 230 employs tunnel magnetoresistance (TMR), the spacer layer 306 may be made of nonmagnetic material such as $Al_2O_3$, MgO, ZnO, or the like in which a large spin dependent tunneling phenomenon can be expected. The FGL 308 may be a magnetic layer having a large Ms and zero or negative Hk. In one embodiment, the FGL 308 is CoFe having a thickness of about 12 nm. The Ms is about 2.3 T and the Hk is about zero.

Figure 4A:
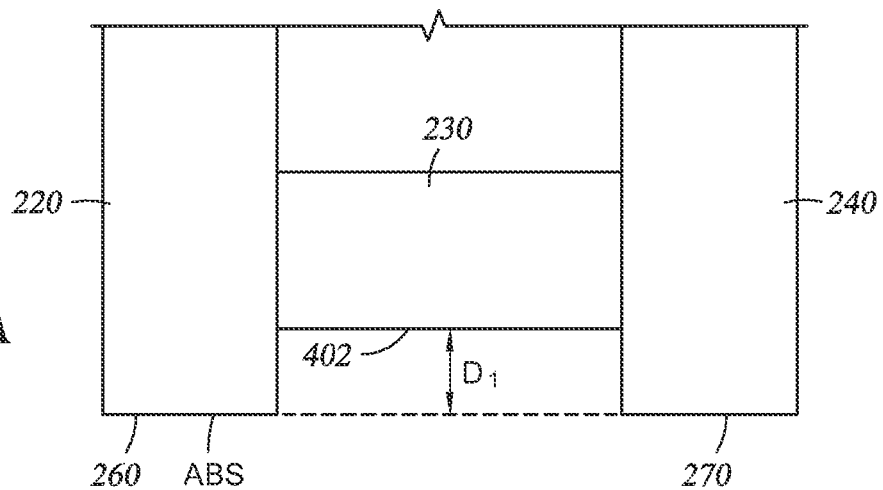
FIGS. 4A-4B are cross sectional views of a main pole, the STO, and a trailing shield according to embodiments of the invention.
Figure 5A:
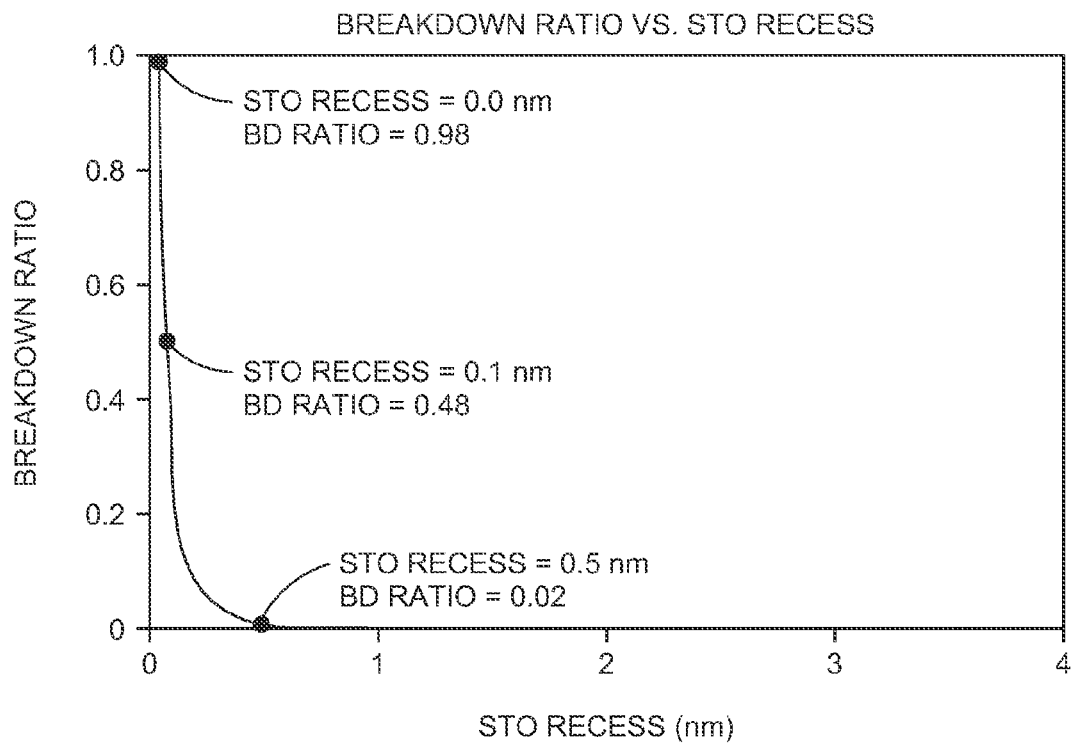
FIGS. 5A-5B are charts showing the effect of a recessed STO, according to various embodiments of the invention.
Figure 5B:
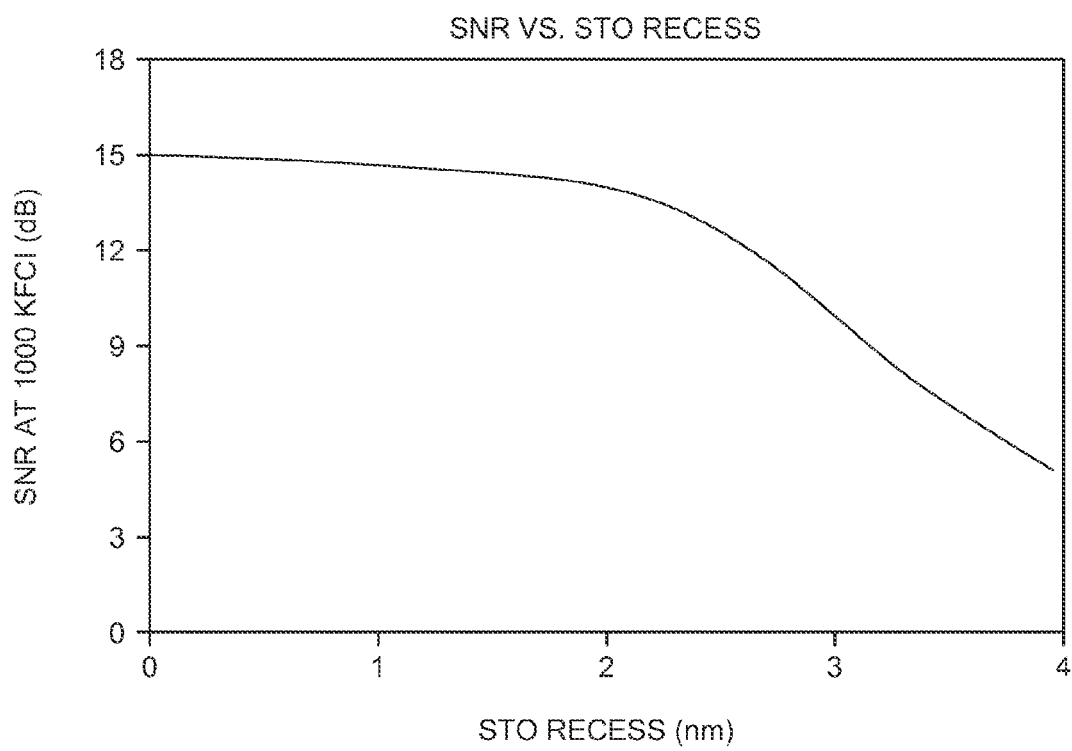

FIG. 4A is a cross sectional view of the main pole 220, the STO 230 and the trailing shield 240 when no bias voltage is applied to the STO 230. As shown in FIG. 4A, the end 260 of the main pole 220 and the end 270 of the trailing shield 240 define part of the ABS. The STO 230 has a surface 402 facing the ABS and the surface 402 is recessed from the ABS by a distance indicated as "D1." In one embodiment, the surface 402 is linear and substantially parallel to the ABS. The distance "D1" may be at least 0.1 nm, such as from 0.2 nm to 2 nm. As shown in FIG. 5A, when "D1" is 0.1 nm, the STO breakdown ratio decreased by 50 percent. The decrease in STO breakdown ratio becomes less significant when "D1" is greater than 0.5 nm. FIG. 5B shows the relationship between the distance "D1" and the signal-to-noise ratio (SNR). As shown in FIG. 5B, SNR decreases significantly when "D1" is greater than 2 nm. Thus, to minimize the breakdown ratio while maintaining SNR, "D1" may be between 0.2 nm and 2 nm.

Figure 4B:
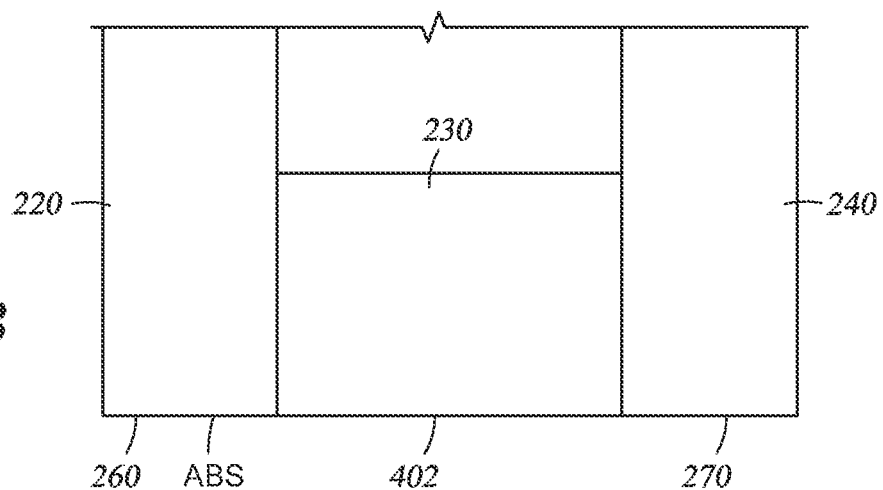

FIG. 4B is a cross sectional view of the main pole 220, the STO 230 and the trailing shield 240 when a bias voltage is applied to the STO 230. As the bias voltage is applied to the STO 230, the temperature of the STO 230 increases. The increase in temperature causes the STO 230 to protrude toward the magnetic disk. As a result, the surface 402 is extended to the ABS and forms a line with the ends 260, 270 that is substantially parallel to the magnetic disk. If the STO 230 is not recessed from the ABS, the surface 402 would protrude beyond the ABS when a bias voltage is applied to the STO, causing the STO to be in contact with the magnetic disk.

Figure 6:
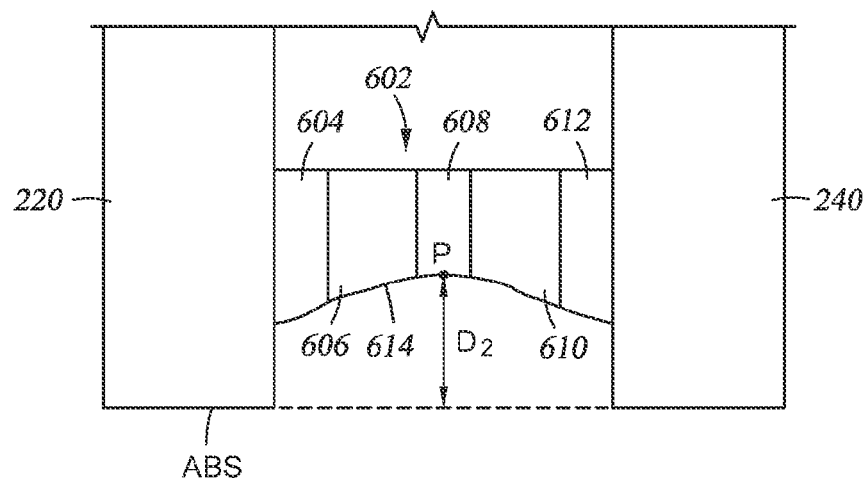
FIG. 6 is a cross sectional view of the main pole, the STO, and the trailing shield according to one embodiment of the invention.

FIG. 6 is a cross sectional view of the main pole 220, a STO 602, and the trailing shield 240 according to one embodiment of the invention. The STO 602 has a curved surface 614 facing the ABS, and the curved surface 614 is recessed from the ABS. The STO 602 has at least two magnetic layers 606 and 610. Layer 606 may be the SPL layer 304 described in FIG. 3 and layer 610 may be the FGL layer 308 described in FIG. 3. Between the SPL layer 606 and the FGL layer 610 is a spacer layer 608, which may be the spacer layer 306 described in FIG. 3. The curved surface 614 has a peak "P" at which the distance to the ABS is at a maximum, as indicated by arrows "D2." The distance "D2" may be at least 0.1 nm, such as from 0.2 nm to 2 nm. The peak "P" is located within the spacer layer 608. The STO 602 may include an underlayer 604 and a cap layer 612.

Figure 7:
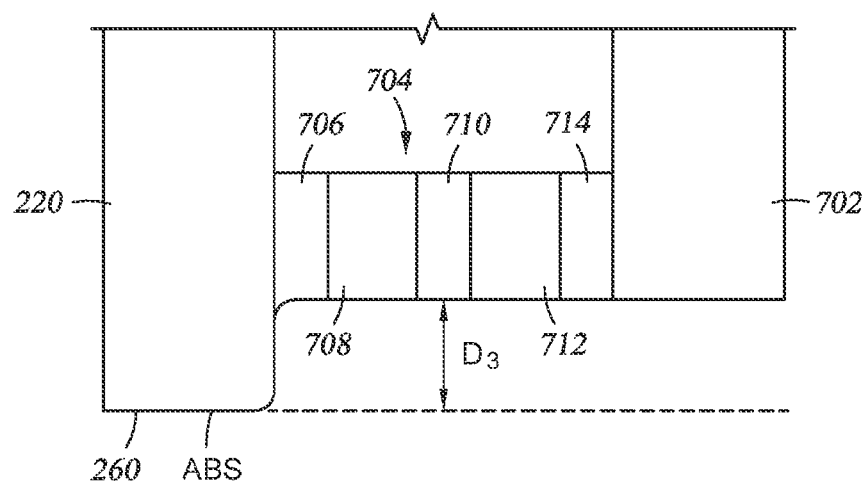
FIG. 7 is a cross sectional view of the main pole, the STO, and the trailing shield according to one embodiment of the invention.

FIG. 7 is a cross sectional view of the main pole 220, a STO 704, and a trailing shield 702 according to one embodiment of the invention. Only the end 260 of the main pole 220 helps defining part of the ABS, and both the STO 704 and the trailing shield 702 are recessed from the ABS. The STO 704 and the trailing shield 702 are recessed from the ABS by a distance indicated as "D3." The distance "D3" may be at least 0.1 nm, such as from 0.2 nm to 2 nm. The STO 704 may include at least two magnetic layers 708 and 712. Layer 708 may be the SPL layer 304 described in FIG. 3 and layer 712 may be the FGL layer 308 described in FIG. 3. Between the SPL layer 708 and the FGL layer 712 is a spacer layer 710, which may be the spacer layer 306 described in FIG. 3. The STO 704 may include an underlayer 706 and a cap layer 714.

Figure 8:
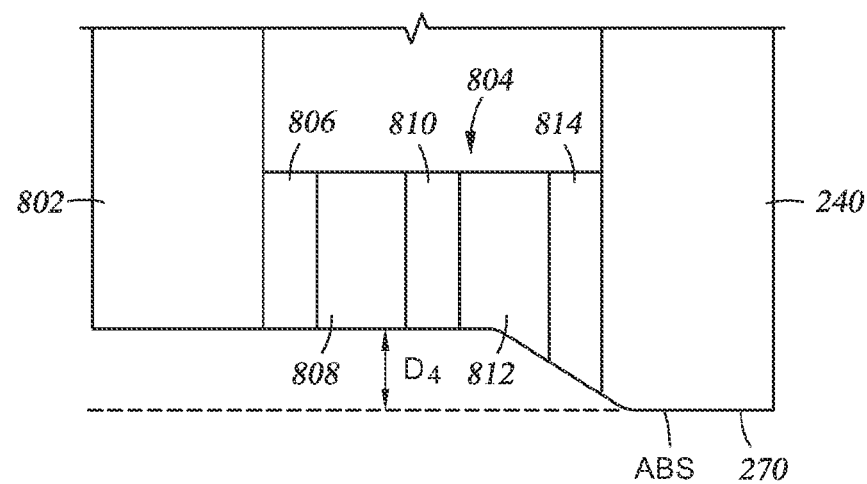
FIG. 8 is a cross sectional view of the main pole, the STO, and the trailing shield according to one embodiment of the invention.

FIG. 8 is a cross sectional view of a main pole 802, a STO 804, and the trailing shield 240 according to one embodiment of the invention. Only the end 270 of the trailing shield 240 helps defining part of the ABS, and both the STO 804 and the main pole 802 are recessed from the ABS. The STO 804 and the main pole 802 are recessed from the ABS by a distance indicated as "D4." The distance "D4" may be at least 0.1 nm, such as from 0.2 nm to 2 nm. The STO 804 may include at least two magnetic layers 808 and 812. Layer 808 may be the SPL layer 304 described in FIG. 3 and layer 812 may be the FGL layer 308 described in FIG. 3. Between the SPL layer 808 and the FGL layer 812 is a spacer layer 810, which may be the spacer layer 306 described in FIG. 3. The STO 804 may include an underlayer 806 and a cap layer 814.

In summary, a MAMR head having a recessed STO is disclosed. The STO has a surface facing the ABS and the surface is recessed from the ABS. The surface of the STO may be linear or curved. When a bias voltage is applied to the STO, the temperature of the STO increases. The increase in temperature causes the STO to protrude toward the magnetic disk. Since the STO is recessed from the ABS, the surface of the STO facing the ABS would extend to the ABS and not beyond the ABS, thus preventing the STO from contacting the magnetic disk.

While the foregoing is directed to embodiments of the present invention, other and further embodiments of the invention may be devised without departing from the basic scope thereof, and the scope thereof is determined by the claims that follow.

What is claimed is:

1. A microwave assisted magnetic recording head, comprising:
    a main pole;
    a trailing shield; and
    a spin torque oscillator positioned between the main pole and the trailing shield, wherein the spin torque oscillator has a surface for facing a magnetic disk and the surface is recessed from an air bearing surface, and wherein a distance between the surface of the spin torque oscillator and the air bearing surface ranges from 0.2 nm to 2 nm.

2. The microwave assisted magnetic recording head of claim 1, wherein the surface of the spin torque oscillator is linear and substantially parallel to the air bearing surface.

3. The microwave assisted magnetic recording head of claim 1, wherein the trailing shield has an end including the air bearing surface.

4. The microwave assisted magnetic recording head of claim 1, wherein the main pole has an end including the air bearing surface.

5. The microwave assisted magnetic recording head of claim 1, further comprising an insulating material disposed adjacent the spin torque oscillator in a cross-track direction, wherein the insulating material includes the air bearing surface.

6. The microwave assisted magnetic recording head of claim 1, wherein the spin torque oscillator comprises at least two magnetic layers and a nonmagnetic layer disposed therebetween.

7. The microwave assisted magnetic recording head of claim 1, wherein the spin torque oscillator comprises at least two magnetic layers and a nonmagnetic layer disposed therebetween.

8. The microwave assisted magnetic recording head of claim 7, wherein the surface of the spin torque oscillator is curved, and a peak that is the farthest from the air bearing surface is located within the nonmagnetic layer.

9. The microwave assisted magnetic recording head of claim 1, wherein the spin torque oscillator has a breakdown ratio of less than 0.02.

10. The microwave assisted magnetic recording head of claim 1, wherein the microwave assisted magnetic recording head has a signal-to-noise ratio of greater than 12.

11. A microwave assisted magnetic recording head, comprising:
    a main pole having an end including an air bearing surface;
    a trailing shield having an end including the air bearing surface; and
    a spin torque oscillator positioned between the main pole and the trailing shield, wherein the spin torque oscillator has a surface for facing a magnetic disk and the surface is recessed from the air bearing surface, and wherein a distance between the surface of the spin torque oscillator and the air bearing surface ranges from 0.2 nm to 2 nm.

12. The microwave assisted magnetic recording head of claim 11, wherein the surface of the spin torque oscillator is linear and substantially parallel to the air bearing surface.

13. The microwave assisted magnetic recording head of claim 11, further comprising an insulating material disposed adjacent the spin torque oscillator in a cross-track direction, wherein the insulating material includes the air bearing surface.

14. The microwave assisted magnetic recording head of claim 11, wherein the spin torque oscillator comprises at least two magnetic layers and a nonmagnetic layer disposed therebetween.

15. The microwave assisted magnetic recording head of claim 14, wherein the surface of the spin torque oscillator is curved, and a peak that is the farthest from the air bearing surface is located within the nonmagnetic layer.

16. The microwave assisted magnetic recording head of claim 11, wherein the spin torque oscillator has a breakdown ratio of less than 0.02.

17. The microwave assisted magnetic recording head of claim 11, wherein the microwave assisted magnetic recording head has a signal-to-noise ratio of greater than 12.

18. A microwave assisted magnetic recording head, comprising:
- a main pole having an end including an air bearing surface;
- a trailing shield;
- a spin torque oscillator positioned between the main pole and the trailing shield, wherein the spin torque oscillator has a surface for facing a magnetic disk and the surface is recessed from the air bearing surface, and wherein a distance between the surface of the spin torque oscillator and the air bearing surface ranges from 0.2 nm to 2 nm; and
- an insulating material disposed adjacent the spin torque oscillator in a cross-track direction.

19. The microwave assisted magnetic recording head of claim 18, wherein the insulating material includes the air bearing surface.

20. The microwave assisted magnetic recording head of claim 18, wherein the spin torque oscillator comprises at least two magnetic layers and a nonmagnetic layer disposed therebetween.

* * * * *